Aug. 15, 1933.  A. HARGRAVES  1,922,291
BALLOON TIRE
Filed March 7, 1932  2 Sheets-Sheet 1

INVENTOR
Albert Hargraves

ATTORNEYS

Aug. 15, 1933.                A. HARGRAVES                1,922,291
                               BALLOON TIRE
                          Filed March 7, 1932          2 Sheets-Sheet 2
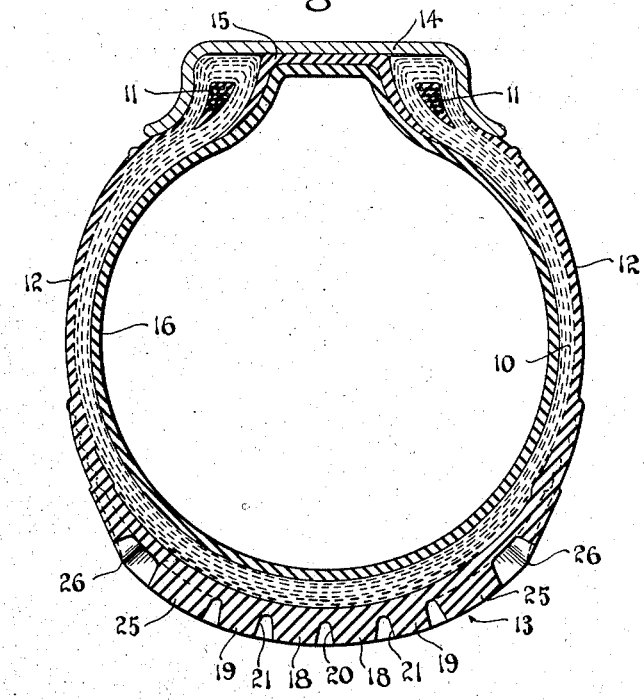
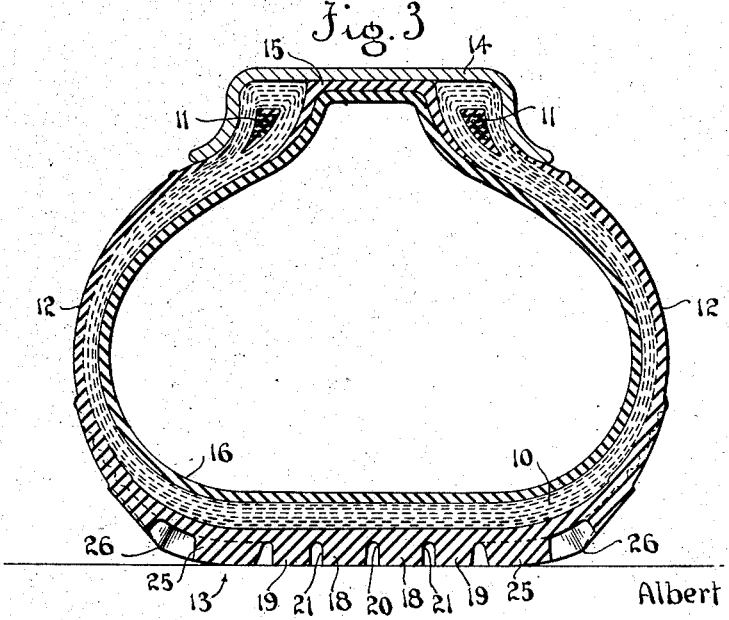
INVENTOR
Albert Hargraves
BY
ATTORNEYS Patented Aug. 15, 1933

1,922,291

UNITED STATES PATENT OFFICE 1,922,291

BALLOON TIRE

Albert Hargraves, Akron, Ohio, assignor to The Firestone Tire and Rubber Company, Akron, Ohio, a Corporation of Ohio Application March 7, 1932. Serial No. 597,219

4 Claims. (Cl. 152—13)

This invention relates to balloon tires, and more especially it relates to improved tread construction on balloon tires.

Balloon tires under normal inflation and load present relatively large surface area in contact with the roadway, with the result that in previous balloon tire constructions the tread rubber was compressed transversely of the tire to such a degree as to cause considerable "wiping" action at the sides of the tread with resulting wear at these points.

The chief objects of this invention are to provide a balloon tire having an improved tread construction that will wear uniformly; that will not be subject to wiping action at the sides of the tread; that will obviate the imposing of great strain in the tread region of the body of the tire; that will travel over a roadway without disagreeable tire-noise; and to provide a tread construction having sufficient "free" edges to engage the roadway to prevent skidding. Other objects will be manifest.

Of the accompanying drawings,

Figure 2 is a section on the line 2—2 of Figure 1;

Figure 3 is a view similar to Figure 2 showing the tire section distorted as it appears under normal load.

Figure 1:
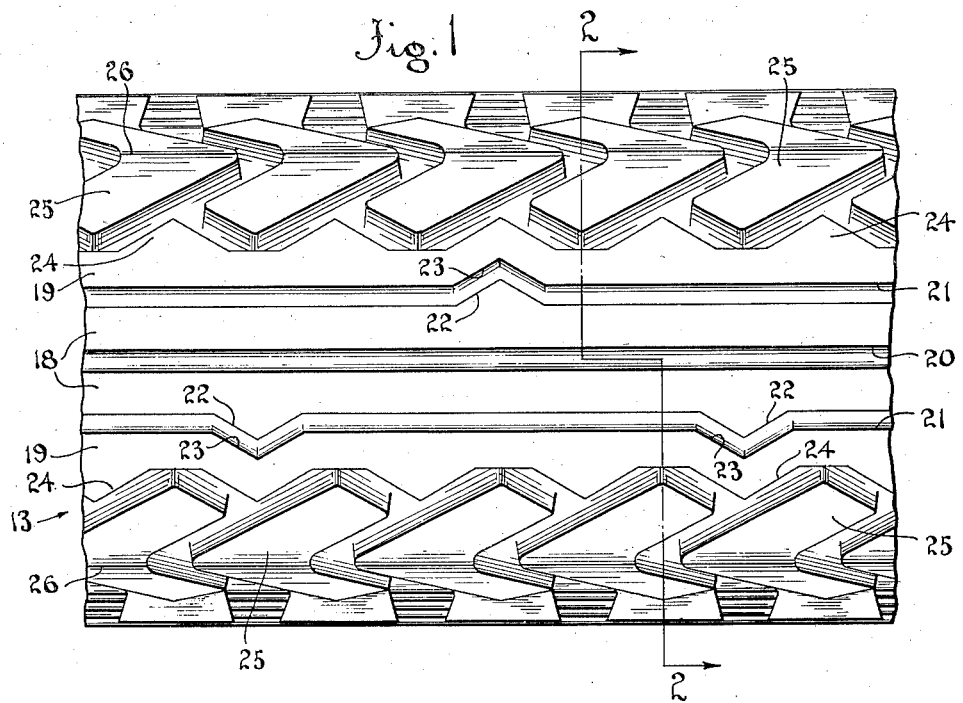
Figure 1 is an edge view of a portion of a balloon tire embodying the invention.

This application is a continuation in part of my co-pending application Serial No. 16,701, filed March 19, 1925.

Referring to the drawings, there is shown therein a balloon tire comprising a body portion 10 of rubberized fabric, the usual inextensible beads 11, 11, flexible side walls 12, 12, and a tread portion 13 constituting one embodiment of the invention. As is shown in Figures 2 and 3, the tire is normally mounted for use upon an annular metal rim 14 and provided with the usual tire flap 15 and inner tube 16.

The tread portion 13 comprises four parallel circumferential ribs of which 18, 18 are the central or inner ribs and 19, 19 are the outer ribs, said ribs being separated from each other by a central groove 20 and grooves 21, 21 at each side thereof. At spaced intervals circumferentially of the tire the ribs 18 are formed with oppositely extending lateral projections 22, 22, the edges of which are disposed substantially 30° to the direction of travel of the tire. The projections 22 of each rib 18 are staggered with relation to the projections on the other rib 18, and each of the ribs 19 is formed with a reentrant 23 opposite each projection 22 so that the grooves 21 are of uniform width throughout. The outer edge of each rib 19 is formed with a circumferential series of projections 24, 24 that are of the same shape as the projections 22 but somewhat larger and closer together than the latter, there being a projection 24 in transverse alignment with each projection 22, and two intermediate thereof. The projections 24 represent the merging of non-skid blocks or characters with the circumferential ribs 19 of the tread, the arrangement being such that only the outer edges of the blocks are preserved in the merged structure.

The remainder of the tread, laterally of each rib 19, is formed with non-skid elements consisting of respective circumferential series of separated blocks 25, 25 of such size that the respective lateral edges or shoulders 26, 26 of the tread pass centrally through each series of blocks, so that half of each character extends onto the side of the tire. As shown, the blocks 25 on one side of the tread may be reversed as compared to those on the other side, although they may be similarly disposed if desired. The elements 25 may be so shaped and positioned as to nest with each other, that is, their positions overlap circumferentially of the tire, which arrangement makes for greater riding comfort and reduces noise. The blocks are constructed with straight edges and somewhat rounded corners, said edges being angularly disposed to the direction of movement of the tire and with respect to each other.

As will be seen by reference to Figure 3 the flexing or flattening of the tread 13 under normal load brings the several ribs 18, 19 completely into contact with the roadway, and the blocks 25 partly into contact with the roadway. The provision of the several ribs and intervening grooves provides such transverse flexibility in the tire tread as to cause it easily to flatten against a roadway without setting up severe strain in the body fabric of the tire in the tread region thereof.

Figure 4:
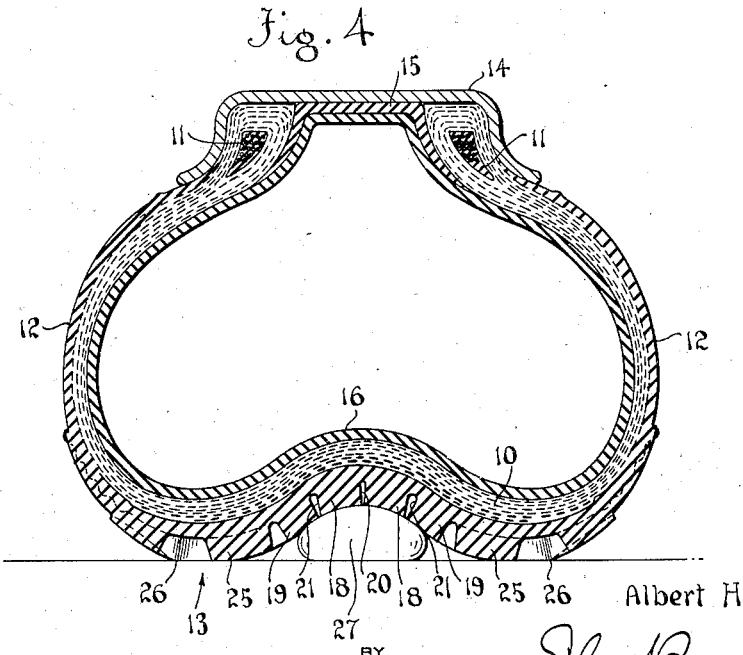
Figure 4 is a view similar to Figure 3 showing the tire section distorted and flexed as when passing over an obstruction in the road.

Figure 4 illustrates the reflex bending of the tire tread as it passes over an obstruction 27 in the roadway, resulting in a further contracting of grooves 20 and 21 which relieve compressive strain in the tread and tension in the fabric body of the tire. This reverse bending of the tire body and tread thereby permits the tire to pass over such obstructions as stones and car tracks without lifting or jolting the wheels and body of the automobile.

Because of their continuous structure circumferentially of the tire, there is no wiping action on the ribs due to forward or backward movement of the tire. The transverse flexing of the tire, however, produces transverse distortion that induces a lateral wiping action which normally is greatest in the medial area of that portion of the tire in contact with the roadway, but which, in the present construction, is substantially diminished by the presence of the series of grooves 20, 21 which contract to permit transverse flattening of the tire or reflex bending thereof when passing over an obstruction, without excessive compression of the rubber in the tread and without consequent tension in the fabric body of the tire. The feature of the laterally extending projections 22, 24 assists the otherwise smooth, unbroken ribs 18, 19 in obtaining better traction and in preventing skidding, the angular edges of said projections, of which several are in contact with the roadway at the same time, being especially effective for this purpose. The projections 22, 24 are on those sides of the ribs 18, 19 that are remote from the central plane of the tire, so that said projections are little affected by any transverse wiping action of said ribs.

The non-skid elements 25 have "free" edges disposed at an angle to the direction of travel of the tire. They provide traction and resistance to skidding, and, being positioned remote from the region of greatest compression in the tread, and being detached from the central portion of the tread structure, are subject to little or no wiping action.

The invention provides a durable and efficient tire that causes little tire noise, and achieves the other objects set forth in the foregoing statement of objects.

Modification may be resorted to without departing from the spirit of the invention or the scope of the appended claims which are not limited wholly to the exact construction shown and described.

What is claimed is:

1. The combination with a balloon tire casing having a vulcanized rubber composition tread and a fabric body portion, said tread being provided with continuous ribs and a series of traction and non-skid blocks outwardly flanking said ribs, said ribs being so spaced in relation to each other and so disposed in reference to the outwardly flanking traction and non-skid blocks to provide between said ribs and traction and non-skid blocks open areas of dimension and contour sufficient under normal tire load and inflation conditions to permit the traction surface of the tread to substantially increase without imposing undue and destructive tension on the fabric body.

2. The combination with a balloon tire having a flexible body portion of rubberized fabric, of a tread normally of rounded contour and capable of transverse flexing under normal load and inflation conditions to substantially increase its traction surface, said tread having thereon a plurality of circumferential continuous ribs, circumferentially disposed spaced non-skid projections outwardly flanking said ribs, said ribs being so spaced in relation to each other and so disposed in relation to the outwardly flanking non-skid projections to provide between said ribs and traction and non-skid projections spaces of an area and contour sufficient under normal load and inflation conditions imposed on the tire to permit the traction surface of the tread to substantially increase without imposing an undue and destructive tension on the fabric body.

3. A balloon tire casing having a vulcanized rubber composition tread and a flexible body portion of rubberized fabric, circumferential continuous spaced ribs on opposite sides of the central plane of the casing, laterally disposed traction projections extending from said ribs into grooves therebetween at points opposite the central plane of the casing, the spaces between said ribs being of an area and contour sufficient to permit the traction surface of the tread to be substantially increased under normal load and inflation conditions of the tire without imposing destructive tension on the fabric body, and a series of spaced anti-skid projections outwardly flanking and functionally distinct from said ribs.

4. The combination with a balloon tire casing having a vulcanized rubber composition tread and a fabric body portion, said tread being provided with spaced continuous ribs, traction projections extending laterally from said ribs into the spaces therebetween, a series of traction and non-skid blocks outwardly flanking said ribs and circumferentially disposed on the tread of the tire, said ribs being so spaced in relation to each other and in relation to the outwardly flanking traction and non-skid blocks to provide therebetween spaces of an area and contour sufficient under normal load and inflation conditions to permit the traction surface of the tread to substantially increase without imposing undue and destructive tension on the fabric body.

ALBERT HARGRAVES.